United States Patent [19]
Billingsley

[11] Patent Number: 5,189,847
[45] Date of Patent: Mar. 2, 1993

[54] RESURFACING DEVICE

[76] Inventor: Roger Billingsley, R.R. #2, Goulais River, Ontario P0S 1E0, Canada

[21] Appl. No.: 735,235

[22] Filed: Jul. 24, 1991

[51] Int. Cl.$^5$ .......................................... B24B 19/00
[52] U.S. Cl. ............................ 51/241 R; 51/241 S; 51/241 B; 51/170 PT.
[58] Field of Search ............ 51/241 R, 241 G, 241 S, 51/241 B, 251, 170 R, 170 PT, 179

[56] References Cited

U.S. PATENT DOCUMENTS

| | | | |
|---|---|---|---|
| 1,340,032 | 5/1920 | Fleming. | |
| 2,257,619 | 9/1941 | Prill | 51/241 B |
| 2,465,599 | 3/1949 | McDiarmid | 51/241 B |
| 2,869,293 | 1/1959 | Howard | 51/241 B |
| 3,183,585 | 12/1962 | West. | |
| 3,208,134 | 11/1961 | Krewson. | |
| 4,098,029 | 7/1978 | Shiets | 51/241 B |
| 4,478,425 | 10/1984 | Benko | 280/433 |

*Primary Examiner*—M. Rachuba
*Attorney, Agent, or Firm*—Stanley E. Johnson

[57] ABSTRACT

A portable device for resurfacing in situ a fifth wheel king pin depending from the underside of a transport trailer. The device includes an elongate member, which is vertically disposed when in use, engagable at its upper end with the pin and supportable at its opposite end on a surface below the pin. Pivotably mounted on the elongate member, for swinging thereabout, is a first arm. Movably mounted on and extending from the end of the first arm remote from the elongate member is a second arm. The second arm is adjustably positionable relative to the first arm. The second arm includes, toward its end remote from its movable connection with the first arm, a device, preferably an adjustably mounted power driven grinder, for resurfacing the king pin.

12 Claims, 2 Drawing Sheets

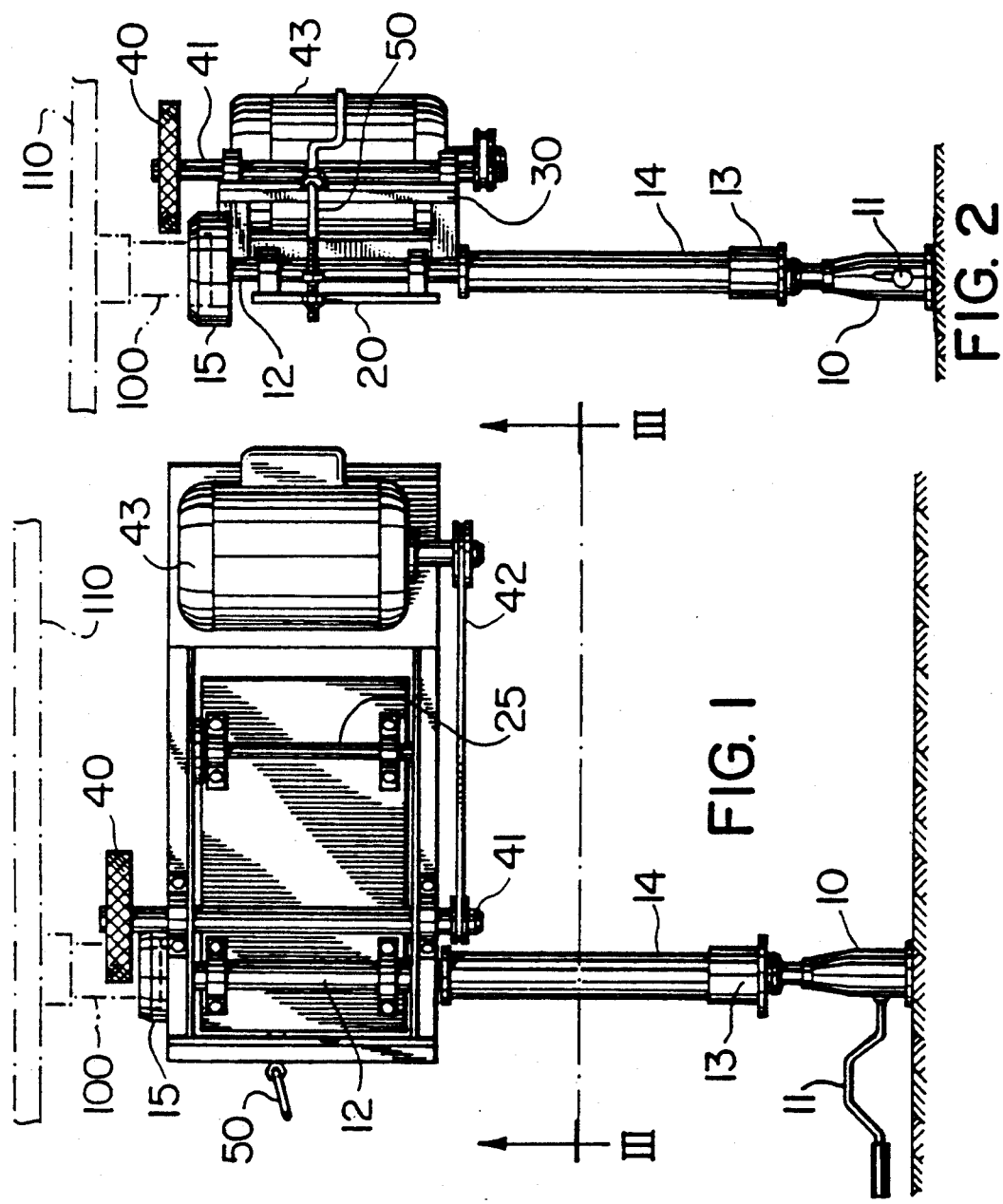

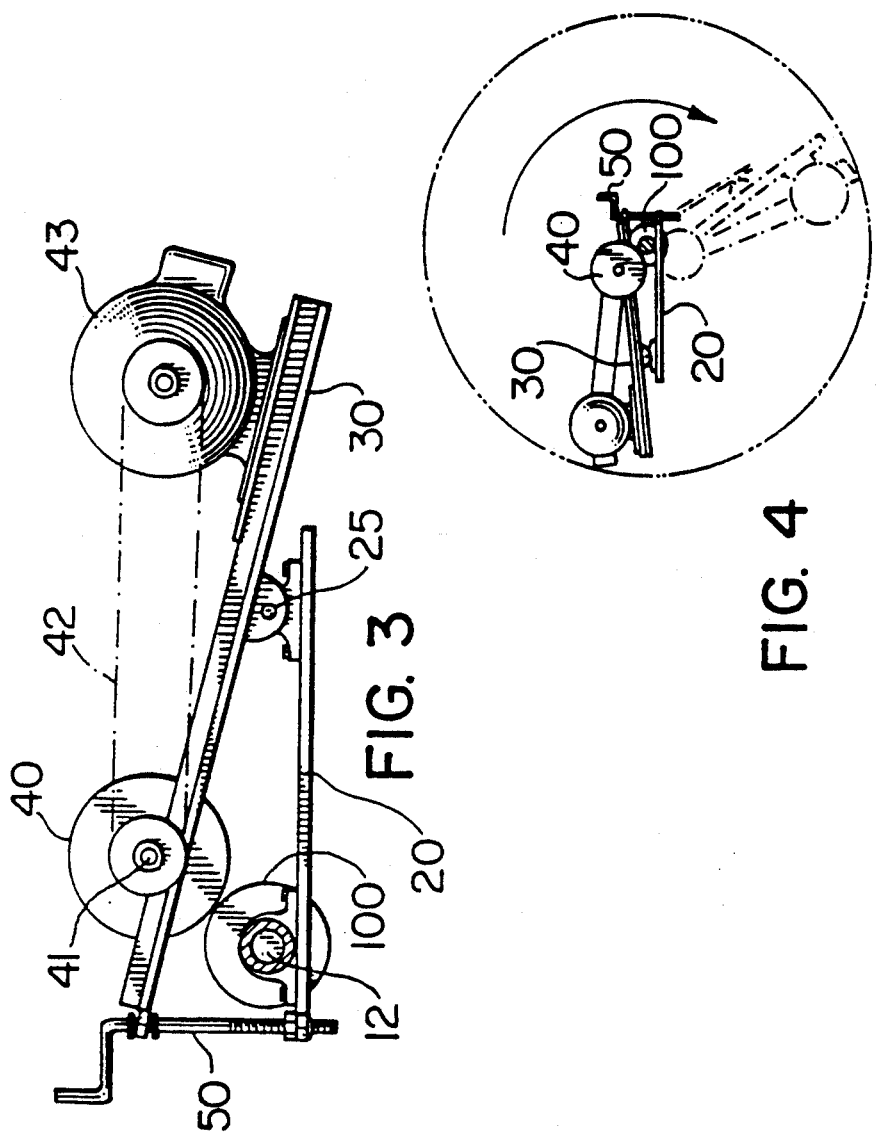

RESURFACING DEVICE

FIELD OF INVENTION

The present invention relates to a portable device for resurfacing in situ a fifth wheel king pin depending downwardly from a transport trailer. The device includes an elongate member which is positioned vertically when used, to extend from a surface below the pin to the pin to be resurfaced and includes means for securing the member in position relative to the pin. The device also includes a first arm pivotably mounted on the elongate member, and a second arm movably mounted (preferably pivotably mounted) on the first arm. The second arm has mounted thereon means for resurfacing the pin. By rotating the first arm about the elongate member, and restricting the movement of the second arm relative to the first arm, a cylindrical object such as a fifth wheel king pin may be ground to a desired diameter.

BACKGROUND OF INVENTION

Through use over time, the king pin of a transport trailer unit is subjected to wear which results in a reduction in the diameter of the pin, and a consequent reduction in the integrity of the mechanical connection between the transport trailer and tractor unit. As a result, the pin must be refurbished or restored to its full operational diameter. Several methods of refurbishing transport trailer king pins are known in the art. Typically, the pin is restored to its full operational diameter by firstly rebuilding the pin by adding new metal to increase the diameter of the pin beyond its operational diameter, and then by grinding the built up pin down to its operational diameter. Prior to grinding down the built up pin, the pin must ordinarily be removed from the transport trailer owing to the lack of a suitable device with which to precision grind an installed built up pin to the required operational diameter. A disadvantage of the foregoing is that removal and replacement of the pin is both time consuming and expensive, owing to both the cost of labour for removal and replacement of the pin and the extended period of time during which the transport trailer is out of use.

It is desirable to have a device which facilitates complete refurbishment of a fifth wheel king pin without the removal of same from the transport trailer. It is also desirable to have a device for grinding an installed king pin which is portable and easy to use.

SUMMARY OF THE INVENTION

In keeping with the foregoing there is provided in accordance with the present invention a portable device for resurfacing in situ a fifth wheel king pin depending from the underside of a transport trailer. The device includes an elongate member which during use of the device extends from the pin to be resurfaced to a surface or floor below the pin, and includes preferably toward its upper end means such as a shallow cup shaped socket, centering protrusion or the like for engaging the pin. The centering protrusion on the upper end of the elongate member may be receivable in a complimentary hollow in the pin.

The device also includes a first arm pivotably mounted on and extending horizontally from the elongate member. Preferably, the first arm extends from the upper part of the elongate member. A second arm is movably, preferably pivotably, mounted on the first arm. Alternatively, the second arm may be slidably mounted on the first arm. The second arm preferably extends horizontally from a part of the first arm remote from the elongate member. The second arm includes means for resurfacing the pin as the first arm is pivoted about the elongate member, such as a power driven grinder, which is preferably adjustably mounted on a part of the second arm remote from the connection of the second arm with the first arm.

The device also includes means for adjusting the vertical position of the grinder relative to the pin when the device is in use.

The device also includes means for adjustably positioning the second arm relative to the first arm, and the elongate member may comprise a vertically adjustable jack post.

BRIEF DESCRIPTION OF THE DRAWINGS

The invention is illustrated by way of example in the accompanying drawings wherein:

FIG. 1 is an elevational view of a first embodiment of the invention;

FIG. 2 is an end view of FIG. 1;

FIG. 3 is a bottom view of FIG. 1 taken along the line III—III in FIG. 1; and

FIG. 4 is a top view of FIG. 1 illustrating the device in a first position and broken line illustrating it in a second position.

DETAILED DESCRIPTION OF PREFERRED EMBODIMENTS

Referring to FIGS. 1, 2 and 3 of the drawings, there is illustrated a portable device for resurfacing in situ a fifth wheel king pin depending from the underside of a transport trailer. The device includes a vertically disposed elongate member comprising a coarse adjustment jack 10 operated by a crank arm 11, and extending upwardly therefrom a shaft 12. Shaft 12, at its lower end, is connected to (or supported by) internally threaded pipe coupling 13 located atop jack 10. Internally threaded pipe coupling 13 in turn engages the externally threaded lower end of sleeve 14 surrounding the lower part of shaft 12. At the upper end of shaft 12 is located a socket or cup 15 for receiving an end portion of the pin 100. Cup 15 provides means for aligning pin 100 and shaft 12 where they abut and maintaining such alignment during use of the device. Alternatively, shaft 12 can be provided with a centering pin that projects into a complimentary hollow in the bottom end of the king pin.

Pivotably mounted on shaft 12 and extending from atop sleeve 14 is a first arm comprised of a first frame 20. First frame 20 may freely rotate 360° about shaft 12 atop sleeve 14.

As illustrated in FIG. 3, a second arm in the form of a second frame 30 is in the illustrated embodiment pivotably mounted on first frame 20 such that second frame 30 may swing or pivot relative to first frame 20 about a rod 25. Mounted on second frame 30 are means for resurfacing pin 100 in the form of a power driven grinding wheel 40 mounted on a rotatable shaft 41 which is connected to a motor 43 by a belt 42. Though not illustrated, motor 43 may be connected to an external power source such as an electrical supply.

As illustrated in FIG. 3, second frame 30 is adjustably positionable relative to first frame 20 by adjusting threaded rod 50 which connects an end of second frame 30 with an adjacent end of first frame 20. In the illustrated embodiment, rod 50 is journaled for rotation in an opening in second frame 30, but is restricted in its sliding movement relative to frame 30. By turning threaded rod 50, the distance between the proximate adjacent ends of first frame 20 and second frame 30, and thus grinding wheel 40 and pin 100, may be varied.

To illustrate the operation of the invention herein described, reference may be had to FIGS. 1 and 2 which illustrate the resurfacing device in position to commence grinding a worn pin 100 which has been built up by the addition of metal, to FIG. 3 which illustrates the positioning of grinding wheel 40 relative to pin 100, and to FIG. 4 which illustrates the free rotation of first frame 20 and the connected grinding apparatus about shaft 12 atop sleeve 14.

Referring to FIG. 1 of the drawings, the device is positioned beneath a built up fifth wheel king pin 100 depending from the underside 110 of a transport trailer by first placing the device with coarse adjustment jack 10 in a collapsed condition beneath pin 100, and then using crank arm 11 to extend coupling 13 and shaft 12 upwardly until guiding cup 15 engages pin 100 with moderate pressure. Any necessary adjustment in the alignment of shaft 12 beneath pin 100 should then be made to ensure that shaft 12 and guiding cup 15 are centered beneath pin 100 before tightening jack 10 to firmly secure the position of the resurfacing device beneath pin 100.

As built up pin 100 may be of uneven diameter, the maximum diameter of pin 100 should be located as the point or area at which to commence grinding. This commencement point or area may be located by alternately adjusting threaded rod 50 to displace grinding wheel 40 from pin 100, and rotating first frame 20 about shaft 12, until grinding wheel 40 is displaced from pin 100 sufficiently so that first frame 20 may be rotated a full 360° about shaft 12 without any contact between grinding wheel 40 and pin 100. Thereafter, by adjusting threaded rod 50, grinding wheel 40 may be brought a small distance inward toward pin 100, and first frame 20 again rotated about shaft 12 to locate a point or area of maximum diameter of built up pin 100. Once a point or area of maximum diameter of built up pin 100 has been located, grinding may commence by starting motor 43, which through belt 42 and rotatable shaft 41 powers grinding wheel 40.

Once the first point or area of maximum diameter of pin 100 has been ground, first frame 20, with grinding wheel 40 continuing to rotate, may be rotated slowly about shaft 12 and pin 100 through a 360° rotation to ensure that any and all other points or areas of maximum diameter are ground to the same diameter.

Pin 100 may then be ground throughout the desired vertical extent by adjusting the vertical position of grinding wheel 40 after a given cycle of grinding through 360° about pin 100. In the illustrated embodiment, the vertical position of grinding wheel 40 may be adjusted by rotating sleeve 14 (atop of which rests first frame 20 and the connected grinding apparatus) relative to internally threaded pipe coupling 13 until the desired alteration in the vertical position of grinding wheel 40 is effected.

After all of the points or areas of maximum diameter on the built up pin have been ground as aforesaid, threaded rod 50 may then be adjusted to bring grinding wheel 40 a small distance closer to pin 100. With grinding wheel 40 now a small distance closer to pin 100, again grinding may commence at a first point or area of maximum diameter, which may if necessary be located by rotating first frame 20 about shaft 12. Again, first frame 20 may be rotated slowly about shaft 12 and pin 100 through a 360° rotation to ensure that any and all points or areas of maximum diameter are ground to the same, now lesser, diameter.

After completion of any given cycle of grinding through 360° about the pin and throughout the vertical extent of the pin, the diameter of pin 100 may be measured by using calipers or some other suitable measuring instrument to monitor both the minimum and maximum diameter of the pin, and if desired, variations in diameter if any.

The above described procedure of adjusting threaded rod 50 to draw grinding wheel 40 incrementally inward toward shaft 12 and pin 100 after each cycle of grinding through 360° and subsequent measurement is continued until the desired diameter of pin 100 is attained. The device may then be removed by adjusting threaded rod 50 to draw grinding wheel 40 away from shaft 12 and pin 100, and guiding cup 15 may be disengaged from pin 100 by manipulating crank arm 11 of jack 10 to lower cup 15. Thereafter the device may be withdrawn from beneath pin 100.

It will be appreciated that the selection and arrangement of elements described above comprise only one embodiment of the invention, and that many other arrangements are possible within the scope of the invention.

The present invention is not limited to the features of the embodiments so described and illustrated, but includes all variations and modifications within the scope of the claims.

I claim:

1. A device for resurfacing in situ a fifth wheel king pin, said device comprising an elongate member, which during use extends from said pin to a surface below said pin, means adjacent the upper end of said elongate member for engaging said pin, a first arm pivotably mounted on and extending horizontally from said elongate member, a second arm movably mounted on said first arm, means mounted on said second arm for resurfacing said pin as said first arm is pivoted about said elongate member, and means for adjustably positioning said second arm relative to said first arm.

2. The device claimed in claim 1, wherein said first arm is pivotably mounted on and extends horizontally from the upper part of said elongate member.

3. The device claimed in claim 2, wherein said second arm is pivotably mounted on and extends horizontally from a part of said first arm remote from said elongate member.

4. The device claimed in claim 3, wherein said means for resurfacing said pin is located on a part of said second arm disposed at a position spaced from the location of the pivotal connection of said second arm with said first arm.

5. The device claimed in claim 4, wherein said means for resurfacing said pin comprises a power driven grinder.

6. The device claimed in claim 5, including means for adjusting the vertical position of said grinder relative to said pin when said device is in use.

7. The device claimed in claim 6, wherein said means for engaging said pin is a shallow cup-shaped socket.

8. The device claimed in claim 7, wherein said elongate member comprises a vertically adjustable jack post.

9. The device claimed in claim 1, wherein said elongate member comprises a vertically adjustable jack post.

10. A device as defined in claim 1 wherein said means for adjustably positioning said second arm relative to said first arm comprises adjustable means interconnecting said second arm and said first arm.

11. A device for resurfacing in situ a fifth wheel king-pin mounted on a trailer, said device comprising:
   (a) a support;
   (b) grinding means having a grinding face for resurfacing said king-pin;
   (c) means on said support, engagable with said king-pin, for maintaining a fixed predetermined relative positioning of said support and said king-pin;
   (d) frame means mounting said grinding means on said support enabling said grinding means to revolve about an axis substantially coincident with the axis of said king-pin when said support and king-pin are disposed in said fixed predetermined relative position, said frame including a first arm pivotally mounted on said support and a second arm pivotally mounted on said first arm; said grinding means being mounted on said second arm; and
   (e) adjustment means for varying the radial distance of the grinding face of said grinding means from said axis of said king-pin, said adjustment means being selectively operable to vary the relative positioning of said first and second arms.

12. The device claimed in claim 11, wherein said grinding means includes a grinding wheel having a rotational axis which is substantially parallel to said axis of said king-pin and further including means for selectively moving said wheel in a direction along said axis of said king-pin.

* * * * *